United States Patent Office 3,733,349
Patented May 15, 1973

3,733,349
FLUOROCARBON CYANATES
Basil L. Loudas, St. Paul, and Herward A. Vogel, Oakdale, Minn., assignors to Minnesota Mining and Manufacturing Company, St. Paul, Minn.
No Drawing. Original application July 1, 1968, Ser. No. 741,308, now abandoned. Divided and this application Mar. 30, 1971, Ser. No. 129,559
Int. Cl. C07c *119/04*
U.S. Cl. 260—453 AL     7 Claims

ABSTRACT OF THE DISCLOSURE

Methylol-terminated fluorocarbons are reacted with cyanogen halides to produce fluorocarbon cyanates which can be polymerized to produce polyfluorocyanurates having chemical resistance and thermal stability and useful in making shaped plastic or elastomeric articles.

CROSS-REFERENCES TO RELATED APPPLICATION

This is a divisional application of Ser. No. 741,308, filed July 1, 1968, now abandoned.

FIELD OF THE INVENTION

This invention relates to fluorocarbon cyanates and to a method for their preparation.

DESCRIPTION OF THE PRIOR ART

Prior art that discloses a fluorocarbon cyanate is that by E. Grigat et al. in Chem. Ber. 97, 3012 (1964), the cyanate disclosed there being a comparatively simple low molecular weight compound, viz, 2,2,2-trifluoroethyl cyanate, prepared by reacting an acidic aliphatic alcohol with cyanogen chloride in the presence of triethylamine. German Pat. 1,190,184 discloses polyfunctional cyanic acid aromatic esters (devoid of any fluorine substitution) and their polymerization to form polycyanurate polymers having a plurality of cyanurate rings linked by aromatic nuclei.

BRIEF SUMMARY OF THE INVENTION

Briefly, in one aspect of this invention, a novel class of fluorocarbon cyanates are provided, the members of which have one or a multiplicity (i.e. block) of perfluoromethylene units and/or perfluoro(trifluoromethyl)methylene units, and blocks of said units can be separated by ether linkages or methylene linkages, and where said cyanates are terminated with (1) a trifluoromethyl group, $CF_3$, on one end and are terminated with a cyanatomethyl group, $-CH_2OCN$, at the other end (as in the case of monocyanates), or (2) terminated on each end with a cyanatormethyl group (as in the case of dicyanates). These cyanates, in another aspect of this invention, are prepared by reacting respective methylol-terminated fluorocarbons with cyanogen halides in the presence of a base, such as triethylamine. Said cyanates can be thermally polymerized to form fluorocyanurate polymers which can be readily fabricated to form shaped plastic or elastomeric articles having chemical resistance and thermal stability.

DETAILED DESCRIPTION OF INVENTION

The fluorocarbon cyanates of this invention, briefly described above, preferably are monocyanates of the general formula:

$$F_3C(CFX)_aA(CFX)_bCH_2OCN \quad (I)$$

where A is a carbon-to-carbon bond (in which case subscrip $a$ is 1 to 30 and subscript $b$ is zero) or $$-O(CFX-CF_2-O)_c-$$

(in which case subscript $a$ is 1 to 10, subscript $b$ is 1 and subscript $c$ is 1 to 100), and dicyanates of the general formula:

$$NCOCH_2(CFX)_aB(CFX)_bCH_2OCN \quad (II)$$

where B is (1) a carbon-to-carbon bond, in which case $a$ is an integer of 1 to 30 and $b$ is zero, or (2) B is $[(CFX)_dO(CFX)_e]_f$, in which case $a$ and $b$ are zero, $d$ and $e$ are integers of 1 to 30, and $f$ is an integer of 1 to 20, or (3) B is $$(OCF_2-CFX)_gO(CFX)_hO(CFX-CF_2O)_i$$

in which case $a$ and $b$ are 1, $h$ is an integer of 1 to 10, and $g$ and $i$ are integers of 1 to 100, or (4) B is $$[(CF_2CH_2)_j(CF_2-CFK)_k]_m,$$

in which case $a$ and $b$ are integers of 1 to 10, $j$ and $k$ are integers whose ratio $j/k$ is 1/1 to 10/1, $m$ is an integer of 1 to 100, and $(CF_2CH_2)$ and $(CF_2-CFX)$ are randomly distributed units;

and where X in all instances where it appears in Formulas I and II is fluorine or perfluoroalkyl.

Particularly useful subclasses of monocyanates falling within the general scope of Formula I are those of the general formulas:

$$F_3C(CFX)_mCH_2OCN \quad (III)$$

where X is fluorine or a perfluoroalkyl group with 1 to 10 carbon atoms, and $m$ is an integer of 1 to 30;

and

(IV)

where X is fluorine or a perfluoroalkyl radical of 1 to 10 carbon atoms, $m$ is an integer from 1 to 10, and $w$ is an integer of 1 to about 100.

Particularly useful subclasses of dicyanates coming within the scope of General Formula II are those of the general formulas:

$$NCOCH_2(CFX)_mCH_2OCN \quad (V)$$

where X is fluorine or a perfluoroalkyl group of 1 to 10 carbon atoms, and $m$ is an integer from 1 to 30;

$$NCOCH_2[(CFX)_mO(CFX)_o]_pCH_2OCN \quad (VI)$$

where X is fluorine or a perfluoroalkyl group of 1 to 10 carbon atoms, and $m$ and $o$ are integers of 1 to 12, and $p$ is an integer of 1 to 20;

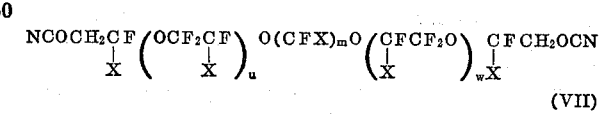
(VII)

where X is fluorine or a perfluoroalkyl group having 1 to 10 carbon atoms, $m$ is an integer of 1 to 10, and $u$ and $w$ are integers of 1 to about 100;

and

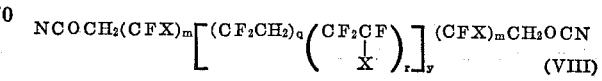
(VIII)

where X is fluorine or a perfluoroalkyl group, having 1 to 10 carbon atoms, m is an integer of 1 to 10, q and r are integers whose ratio is from 1/1 to 10/1, and y is an integer of 1 to about 100.

The cyanates of the above general formulas can be prepared in general by reducing the respective ester precursors to mono- or di-methylol-terminated compounds, viz.,

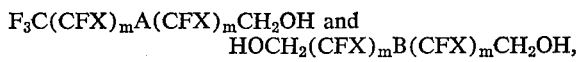
$F_3C(CFX)_mA(CFX)_mCH_2OH$ and
$HOCH_2(CFX)_mB(CFX)_mCH_2OH$, and reacting the latter with cyanogen halides in the presence of a base, such as triethylamine. The ester precursor starting materials themselves can be prepared from the respective fluorocarbon acids or acid halides by esterification with an alcohol. Application Ser. No. 622,099, now abandoned, discloses oxy di(perfluoroacyl fluorides) which can be esterified to produce the corresponding esters, which upon being reduced to the methylol-terminated compounds, (for example, in accordance with the disclosure in copending application Ser. No. 741,299), and cyanated in accordance with this invention, provide the dicyanates of General Formula VI above. U.S. Pats. 3,250,806 and 3,322,826 disclose polymeric acid fluorides and they can also be esterified, reduced, and cyanated in a similar manner to produce the cyanates of Formulas IV and VII above. U.S. Pat. No. 3,438,953 discloses methylol precursors which can be cyanated to provide the cyanates of Formula VII above.

The cyanation reaction of this invention is generally carried out by reacting the methylol precursors with an amount of cyanogen halide in excess of stoichiometric. Because of the exothermic nature of the reaction and the desire to prevent it from running away with consequent loss of methylol reactants, and because of the volatility of the cyanogen halide, low temperatures below the boiling points of the reactants are maintained. Generally, low temperatures in the range of −40 to 40° C., preferably −20 to 0° C., will be used and the reaction carried out in an inert liquid organic solvent. Solvents useful for this purpose representatively include acetone, ether, tetrahydrofuran, aromatic hydrocarbons such as benzene, toluene, and xylene, and halogenated aliphatic or aromatic hydrocarbons. The cyanation reaction is carried out in the presence of a base such as tertiary amines like triethylamine or an alkali metal hydroxide such as sodium hydroxide, the amount of base used being sufficient to neutralize the hydrogen halide produced in the reaction (see German Pat. 1,190,184).

Cyanogen halides which can be used include cyanogen chloride (the preferred cyanating agent), and cyanogen bromide, these cyanating agents being well-known compounds which are commercially available or which can be prepared by well-known methods. Stoichiometrically, one mole of cyanogen halide is reacted with one equivalent of a hydroxyl group in the methylol reactant; however, we prefer to use an amount in excess of stoichiometric e.g. cyanogen halide up to 50% excess.

After cyanation is completed, the cyanate product can be recovered from the reaction mixture by any suitable recovery procedure, such as precipitation, extraction, distillation, crystallization, etc. Preferably, the product is recovered by mixing the reaction mixture with a water-immiscible liquid organic solvent in which the cyanate is soluble, such as methylene chloride, xylene hexafluoride, or fluorocarbons such as Freon 113. The resulting solvent mixture is then poured into ice water. The non-aqueous phase containing the cyanate is separated from the aqueous phase containing the neutralized halide, for example, by decanting, and can be dried, for example, over anhydrous magnesium sulfate, and filtered. The solvent can then be removed from cyanate by stripping, for example, under vacuum at room temperature.

The above-described cyanates are particularly useful as monomers, intermediates or prepolymers for the preparation of fluorocarbon cyanurate polymers, as disclosed in said copending application Ser. No. 741,308. Polymerization of the cyanates is accomplished by heating the cyanates to effect their thermalpolytrimerization. Homopolymers of the cyanates as well as copolymers of two or more of said cyanates, or one or more of said cyanates with one or more aromatic mono- or dicyanates of the prior art, can be prepared in this fashion.

The cyanurate polymers prepared from the cyanates of this invention possess stability at elevated temperatures along with resistance to solvents and corrosive chemicals. They can be used as one-component cured-in-place systems. Shaped articles having either plastic or elastomeric properties can be readily fabricated from these polymers. The fabrication of shaped articles is greatly facilitated by the fact that no volatile by-products are evolved during the curing process. The plastics are tough and strong with high glass transition and heat distortion temperatures, and the elastomeric compositions have glass transition temperatures below room temperature.

Generally, the plastics will have glass transition temperatures ($T_g$) of 20 to 250° C., tensile strengths of 3,000–4,000 p.s.i., and 10–70% elongation, and the elastomers will have glass transition temperatures ($T_g$) of −40 to 20° C., 50 to 300 p.s.i. tensile strengths and 50 to 500% elongation.

The polymers can be used for a variety of purposes, for example, they can be used as protective coatings, impregnants, foams, moldings, tooling compounds, structural adhesives, solid rocket propellant binders, laminating resins, organic solders, structural composites, such as boron filament composites, gaskets, liners, sealants for aircraft fuel tanks, as material for electrical insulation, etc. The polymers per se can be employed for such purposes or can be blended with fillers such as carbon black, silica, titanium oxide, etc.

EXAMPLES

The objects and advantages of this invention are further illustrated by the following examples, but it should be understood that the particular materials used in these examples, and the amounts thereof, and other conditions and details recited in these examples, should not be construed to unduly limit this invention.

Examples 1–8

A number of cyanates of this invention were prepared by cyanating various fluoromethylol precursors with cyanogen chloride. In most runs, the methylol precursors themselves were prepared from respective ester starting materials by dissolving the ester in tetrahydrofuran, and reducing the ester to the methylol compound with sodium borohydride. The general cyanation procedure used was to add a solution of the fluoromethylol compound in cold acetone to a flask containing excess cyangen chloride, and then adding triethylamine dropwise to the mixture, afterwhich the reaction was permitted to proceed for about 15 min. at about −30 to −10° C. In Examples 1.5 and 8, methylene chloride was added to the reaction mixture and in Examples 6 and 7, hexafluoroxylene was added to the reaction mixture. The diluted reaction mixture was then poured into ice water to extract the triethylamine ammonium chloride by-product and acetone, the remaining halogenated hydrocarbon phase separated, dried over anhydrous magnesium sulfate, and filtered. The solvent was then removed from the cyanating product under vacuum at room temperature. A summary of these examples and a description of the cyanate products are set forth in Table I. All of these cyanates can be polymerized by heating at elevated temperatures as described in said copending application Ser. No. 741,308.

TABLE I.—PREPARATION OF CYANATES

| Ex. | Starting material | Hydroxy cyanate precursor | Cyanate |
|---|---|---|---|
| 1 | (¹) | $HOCH_2(CF_2)_3CH_2OH$ | $NCOCH_2(CF_2)_3CH_2OCN$ (Viscous liquid) |
| 2 | $H_3COOC(CF_2)_2O(CF_2)_2COOCH_3$ (B.P. 116–118 C./70 mm. Hg) | $HOCH_2(CF_2)_2O(CF_2)_2CH_2OH$ (B.P. 104–116° C./11 mm. Hg) | $NCOCH_2(CF_2)_2O(CF_2)_2CH_2OCN$ (Viscous liquid) |
| 3 | $H_3COOCF_2CFCF_2CF_2COOCH_3$ <br>          $\|$<br>        $C_2F_5$ <br> (B.P. 118–124° C./5 mm. Hg) | $HOCH_2CF_2CFCF_2CF_2CH_2OH$ <br>        $\|$<br>       $C_2F_5$ <br> (B.P. 138–140° C./16 mm. Hg) | $HCOCH_2CF_2CFCF_2CF_2CH_2OCN$ <br>         $\|$<br>        $C_2F_5$ <br> (Oil) |
| 4 | $H_3COOC(CF_2)_4COOCH_3$ | $HOCH_2(CF_2)_4CH_2OH$ (M.P. 67° C.) | $NCOCH_2(CF_2)_4CH_3OCN$ |
| 5 | $F_3C(CF_2)_6COOCH_3$ | $F_3C(CF_2)_6CH_2OH$ | $F_3C(CF_2)_6CH_2OCN$ (M.P. 85° C.) |
| 6 | $[(CF_2CF)_n(CH_2CF_2)_m(CF_2)_3COOCH_3]_2$ <br>      $\|$<br>    $CF_3$ <br> (m/n=35/65 mol percent) (No. avg. M.W.=3,000) | $[(CF_2CF)_m(CH_2CF_2)_m(CF_2)_nCH_2OH]_2$ <br>      $\|$<br>    $CF_3$ <br> (Viscous syrup) | $[(CF_2CF)_m(CH_2CF_2)_n(CF_2)_3CH_2OCN]_2$ <br>      $\|$<br>    $CF_3$ <br> (Viscous syrup) |
| 7 | $[CH_3OOCF(OCF_2CF)_mO\text{—}(CF_2)_5]_2$ <br>     $\|$     $\|$<br>   $CF_3$  $CF_3$ <br> (M.W.=800) | $[HOCH_2CF(OCF_2CF)_mO\text{—}(CF_2)_5]_2$ <br>      $\|$     $\|$<br>    $CF_3$  $CF_3$ <br> (Viscous liquid) | $[NCOCH_2CF(OCF_2CF)_mO\text{—}(CF_2)_5]_2$ <br>      $\|$     $\|$<br>    $CF_3$  $CF_3$ <br> (Viscous liquid) |
| 8 | $H_3COOC(CF_2)_2O(CF_2)_4O(CF_2)_2COOCH_3$ | $HOCH_2(CF_2)_2O(CF_2)_4O(CF_2)_2CH_2OH$ (Viscous liquid) | $NCOCH_2(CF_2)_2O(CF_2)_4O(CF_2)_2CH_2OCN$ (Viscous liquid) |

¹ Cyanate precursor was commercially obtained.

Various modifications and alterations of this invention will become apparent to those skilled in the art without departing from the scope and spirit of this invention, and it should be understood that this invention is not to be unduly limited to the illustrative embodiment set forth herein.

We claim:
1. Dicyanates of the general formula:

$$NCOCH_2(CFX)_aB(CFX)_bCH_2OCN$$

where B is (I) a carbon-to-carbon bond, in which case $a$ is an integer of 1 to 30 and $b$ is zero, or (II) B is $[(CFX)_dO(CFX)_e]_f$, in which case $a$ and $b$ are zero, $d$ and $e$ are integers of 1 to 30, and $f$ is an integer of 1 to 20, or (III) B is $$(OCF_2\text{—}CFX)_gO(CFX)_hO(CFX\text{—}CF_2O)_i$$

in which case $a$ and $b$ are 1, $h$ is an integer of 1 to 10, and $g$ and $i$ are integers of 1 to 100, or (IV) B is $$[(CF_2CH_2)_j(CF_2\text{—}CFX)_k]_m,$$

in which case $a$ and $b$ are integers of 1 to 10, $j$ and $k$ are integers whose ratio $j/k$ is 1/1 to 10/1, $m$ is an integer of 1 to 100, and $(CF_2CH_2)$ and $(CF_2\text{—}CFX)$ are randomly distributed units; and where X in all instances where it appears in this claim is fluorine or perfluoroalkyl of 1 to 10 carbon atoms.

2. Monocyanates of the general formula:

$$F_3C(CFX)_aA(CFX)_bCH_2OCN$$

where A is $\text{—}O(CFX\text{—}CF_2\text{—}O)_c$ and X is fluorine or perfluoroalkyl having 1 to 10 carbon atoms, $a$ is 1 to 10, $b$ is 1, and $c$ is 1 to 100.

3. Monocyanates according to claim 2, wherein said perfluoroalkyl is trifluoromethyl.

4. Dicyanates according to claim 1, wherein B is said member I and said perfluoroalkyl is trifluoromethyl.

5. Dicyanates according to claim 1, wherein B is said member II and said perfluoroalkyl is trifluoromethyl.

6. Dicyanates according to claim 1, wherein B is said member III and said perfluoroalkyl is trifluoromethyl.

7. Dicyanates according to claim 1, wherein B is said member IV and said perfluoroalkyl is trifluoromethyl.

References Cited
UNITED STATES PATENTS 3,553,244   1/1971   Grigat et al. _____ 260—453

LEWIS GOTTS, Primary Examiner

D. H. TORRENCE, Assistant Examiner

U.S. Cl. X.R.

117—161 UA; 260—2.5 AW, 77.5 NC, 484 P, 485 F, 487 535 H, 535 P, 537 S, 539 R, 544 Y, 614 F, 615 BF, 633